(12) United States Patent
Schlipf

(10) Patent No.: US 6,900,661 B2
(45) Date of Patent: May 31, 2005

(54) REPAIRABLE FINITE STATE MACHINES

(75) Inventor: Thomas Schlipf, Holzgerlingen (DE)

(73) Assignee: International Business Machines Corporation, Armonk, NY (US)

( * ) Notice: Subject to any disclaimer, the term of this patent is extended or adjusted under 35 U.S.C. 154(b) by 27 days.

(21) Appl. No.: 10/603,253

(22) Filed: Jun. 25, 2003

(65) Prior Publication Data

US 2004/0239366 A1 Dec. 2, 2004

(30) Foreign Application Priority Data

Jun. 28, 2002 (EP) .......................................... 02014400

(51) Int. Cl.[7] .......................................... H03K 19/173
(52) U.S. Cl. ............................ 326/46; 326/16; 714/727
(58) Field of Search ................................. 326/9–10, 16, 326/38–41, 46, 104, 105; 714/724–727

(56) References Cited

U.S. PATENT DOCUMENTS

| | | | | |
|---|---|---|---|---|
| 5,949,251 A | * | 9/1999 | Chambers ..................... 326/46 |
| 5,968,196 A | * | 10/1999 | Ramamurthy et al. ...... 714/727 |
| 6,252,881 B1 | * | 6/2001 | Samoylenko ................ 370/433 |
| 6,349,346 B1 | * | 2/2002 | Hanrahan et al. .............. 710/9 |
| 6,744,274 B1 | * | 6/2004 | Arnold et al. ................. 326/16 |
| 6,803,787 B1 | * | 10/2004 | Wicker, Jr. .................... 326/46 |
| 6,804,802 B1 | * | 10/2004 | Lulla et al. .................. 714/727 |

* cited by examiner

Primary Examiner—Vibol Tan
(74) Attorney, Agent, or Firm—Lily Neff; Floyd A. Gonzalez

(57) ABSTRACT

A method and respective hardware logic circuit for implementing partially programmable Finite State Machines in the hardware of digital systems which use finite state machines to implement the control logic of the hardware design. In order to provide a partly reprogrammable Finite State Machine (FSM), which can be reprogrammed in a limited way such that no costly new physical re-build of the chip including said FSM is required, a hardwired FSM includes circuit means that allow that each hardwired product term to be disabled, and further includes means that add programmable product terms which allow adding new behavior to the state machine. Scan-Only SRLs are preferably used to program the required behavior of those programmable product terms.

9 Claims, 19 Drawing Sheets

FSM descriptions via State Tables input variable used in inverted form → 0̄1̄0 ← input variable used in true form

| current state column | inputs column | outputs column | next state column |
|---|---|---|---|
| Sm | 010 | 11 | Sn |
| Sm | 10. | 01 | Sv |
| Sm | 011 | 1. | Sw |
| Sn | 000 | 00 | Sm |
| Sn | 010 | 01 | Sn |

PRIOR ART

The I/Os of a programmable PO-term

REPAIRABLE FINITE STATE MACHINES

BACKGROUND OF THE INVENTION

The present invention relates to the hardware of digital systems, and in particular, it relates to a method and respective hardware logic circuit for implementing partially programmable Finite State Machines.

Developing a complex VLSI-chip is, despite all the verification tools like simulation and formal verification, still an error prone process. Experience shows that usually, there are some errors after the silicon has been built, i.e., the chip is present in hardware form. Typically, those errors are located in the control logic of the chip and not in the data flow logic.

Finite State Machines are the main prior art means to implement the control logic of a digital design. There are numerous tools available, which support the design of such machines. Typically the bugs are associated with the FSMs and it would be highly desirable to make those machines programmable. Full programmability is possible using RAM based techniques; however, the circuit costs are usually prohibitive.

Prior art Finite State Machines (FSM) on the one hand are widely used to implement said control logic. Errors occurring in the state machine cannot be repaired in prior art. After having recognized that an error is present, the chip/circuit logic must be corrected and the hardware must be newly built in silicon.

Another approach to implement the control logic is highly theoretic and not reduced to useful practice until now. This approach would include using fully programmable RAM-based techniques, which generates, however, much too high cost.

Thus, hard-wired technology is preferred to implement said error-prone control logic, and hardware developers suffer from longer development periods required to repeat the "Cementation" of the control logic into silicon "hard wiring".

The principle of a "hard wired" finite state machine is shown in FIG. 1:

It consists essentially of a state register 10, which holds the current state and two functions of 12, and nf 14 to calculate the outputs and the next state, respectively. The functions "nf" for the next state function and "of" for the current output may be implemented as combinational logic as shown in FIG. 1 or with a RAM as mentioned above.

The U.S. Pat. No. 5,825,199 discloses the need for providing a reprogrammable state machine. Further, general requirements are set up which should be fulfilled with such reprogrammable state machine, as are:

It should be implemented using a minimal amount of silicon real estate, the mechanism should have a minimal affect on the timing and performance of the state machine since state machines are very critical in timing, and the programming mechanism should be flexible in that it should allow for the reprogramming of the behavior of the state machine arbitrarily within the limits of state bits, inputs and outputs, and using a reasonable number of logic terms.

Further, in said prior art document, it is disclosed that the improved reprogrammable state machine comprises a programmable logic unit in form of a programmable logic array (PLA), which preferably represents a standard sum of products PLA. This is preferred since it represents the best compromise between silicon area and flexibility. Further, the possibility is disclosed, to use a programmable random access memory (RAM) based PLA, which, however, is stated to be time critical in performance.

Further, a vague and insufficiently enabling teaching is given including a ROM, a RAM and a control unit which produce an output, respectively, which is fed at the input of a state machine programmable logic. The control unit is said to be used for loading the RAM unit with the modified values for the state transitions and/or output transitions for each state, which needs to be modified, i.e. corrected due to an error, which has occurred and been detected. This teaching, however, does not represent an enabling disclosure because the state machine reprogrammable logic cannot already include the corrected output signal, as:

a) it is fully unclear, how an error state is detected and controlled, b) it is not at all disclosed how a corrected output value may appear at the output of the state machine, and c) the internal details of the reprogrammable logic of the state machine, which are highly relevant in the underlying context, are not at all disclosed.

Thus, although the before-mentioned U.S. patent has disclosed the need for a reprogrammable state machine of the above-mentioned hardwired type, it does not offer a solution to this problem.

BRIEF SUMMARY OF THE INVENTION

It is thus an objective of the present invention to provide a partly reprogrammable Finite State Machine (FSM), which can be reprogrammed in a limited way such that no costly new physical re-build of the chip including said FSM is required.

According to the broadest aspect of the present invention a partly reprogrammable state machine is disclosed, comprising a state register holding the current state and two functions of, and nf, comprising combinational logic to calculate the outputs and the next state, respectively, said combinational functions being representable in a "sum of products form", which is characterized by further comprising a) means for disabling a predetermined number of product terms associated with said "sum of product form", each product term corresponding to a given state and a given input vector setting, b) means for enabling a predetermined respective number of new product terms each generating a correct output signal corresponding to a given error state and a given error input bit vector, c) whereby said disabling and/or enabling means are provided in a form which allows activation thereof in case a product term was tested to include a bug.

Consequently, the inventive idea allows advantageously to have a FSM with limited programmability which avoids the huge circuit costs associated with RAM based techniques, but which allows to reprogram the behaviour of the FSM in a limited way. This is sufficient, because experience shows that no full programmability of the FSM is required to fix the bugs in the control logic.

Therefore the inventive idea comprises to supplement a hardwired state machine in the following way:

1. allow that each hardwired product term could be disabled, and
2. add programmable product terms which allow to add new behavior to the state machine. Scan-Only Shift Register Latches (SRLs) are preferably used to program the required behavior of those programmable product terms.

The present invention exploits the knowledge that a full programmability of the Finite State Machine (FSM) is not required to cope with the bugs found. In most cases those bugs can be fixed with a small amount of logic; the behavior needs only to be changed slightly. Therefore a new approach is proposed which provides a limited programmability but which avoids the large circuit sizes required for RAM based Finite State Machine implementations.

Further, when the means for disabling a predetermined number of product terms comprises a control SRL, the output of which connects to an AND gate, the input signals of which further comprises signal lines associated with the error state (S1) and the respective input vector (I1, I2, I3), then an advantageous implementation is provided for a small number of product terms to be corrected.

Further, when the means for disabling a predetermined number of product terms comprises a respective number of disable registers, each associated with a respective decoder, then an advantageous implementation is provided for a larger number (e.g. more than 30) of product terms to be corrected.

When further the means for enabling a new product term comprises
a) an input mask register,
b) an input compare register,
c) a state compare register,
d) an output register, which holds the corrected output signals,
then an advantageous implementation is found for correcting an error-comprising product term.

The same applies for including the next state register, when said state machine further comprises a next state register, which holds the output signals for the next state.

When said state machine further comprises:
a) a means for disabling an error-comprising OTHERWISE logic, and
b) a means for enabling a new corrected "OTHERWISE" logic, which comprises logic reflecting enabled new product terms, the inventive approach and the advantages associated with can be extended to situations which include "OTHERWISE" logic branches in the high-level hardware design tool.

When further the means for disabling a predetermined number of product terms, the means for enabling a predetermined respective number of new product terms and a corrected output signal vector is programmed in a content addressable memory (CAM), whereby the error state and the error input vector is used as a search argument into said content addressable memory (CAM), then an alternative way to solve the underlying problem is found.

When, further, a Random Access Memory (RAM) comprises the logic creating a corrected output vector, and a RAM address generation logic is provided for selectively accessing respective RAM entries, and a state machine select logic is provided for selecting between activation of either the regular state machine or the RAM for generating the desired output vector, a further alternative way to solve the underlying problem is found.

When further, the RAM comprises a plurality of compartments, each of them comprising said input mask logic, input compare logic, next state logic and correct product term output signal logic, respectively, then, an advantageous implementation is found for the RAM-alternative.

Thus, many digital circuit chips can take profit by the present invention, and so do the computer systems—small or large in performance—in which such chips are incorporated.

BRIEF DESCRIPTION OF THE SEVERAL VIEWS OF THE DRAWING

These and other objects will be apparent to one skilled in the art from the following detailed description of the invention taken in conjunction with the accompanying drawings in which:

FIG. 2 is a prior art state table description;

FIG. 4 is a state table illustration of the basic inventional approach;

DETAILED DESCRIPTION OF THE INVENTION

Figure 1:
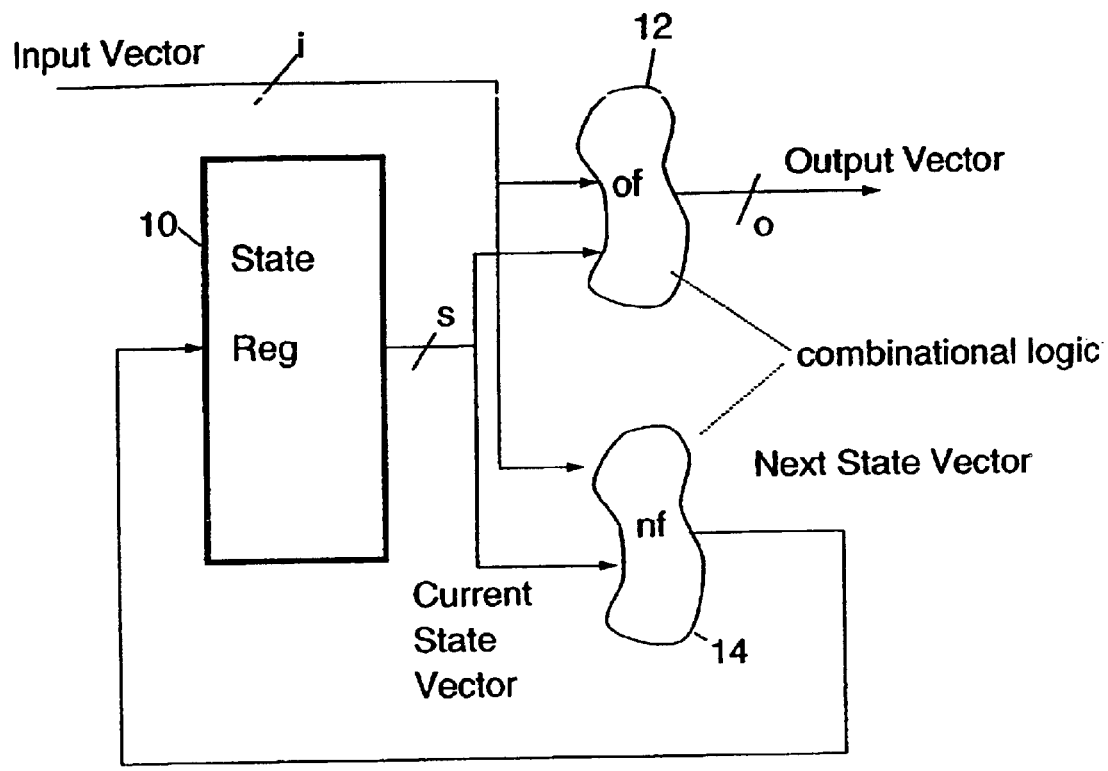
FIG. 1 is a schematic representation illustrating the principle structure of a prior art Finite State Machine (FSM)

In FIG. 1, the general form of a prior art Finite State machine is depicted with a number of i inputs, o outputs, s state signals and s next state signals.

Figure 3:
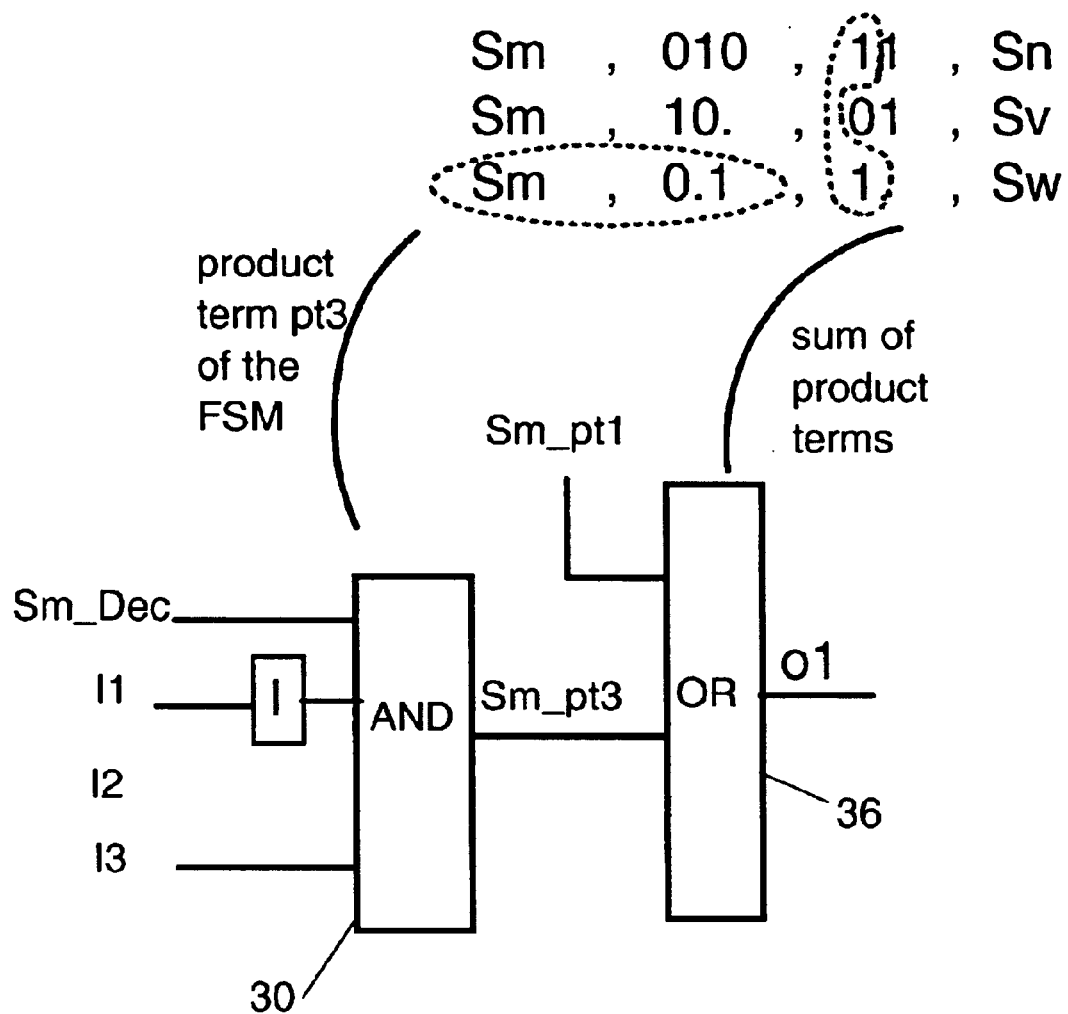
FIG. 3 is a block diagram representation illustrating the relationship between state tables and "sum of products"

With general reference to the figures and with special reference now to FIGS. 2 and 3 the usual FSM description using state table is shortly introduced, as this mode of description is also used for the present invention.

State Machines are either drawn as state diagrams or are represented using state tables. In the following, state table representations are used to illustrate the ideas. Although the presentation assumes that combinational functions are represented in the sum of products form (disjunctive Normal form), however, the same ideas could be easily applied if combinational functions are represented in the product of sums form (conjunctive Normal form) or in any multilevel representation.

In FIG. 2 an extract of a FSM using a state table description is shown. In the first column the current state is shown, in the next two columns the input and the output vector are shown, and in the fourth column the next state is shown. In the example given there are 3 input signals and 2 output signals. A '0' in the input vector column represents that the input signal must be used in the inverted form, a '1' represents that the input signal must be used in it's true form and a '.' represents that this input signal is don't care. Similarly, a '0' for an output signal means that the output must be low, a '1' indicates that the output must be high, and a '.' represents that the value is "don't care" for the corresponding state input vector combination.

In FIG. 3 the prior art relationship between a row in the state table and the corresponding product term (e.g. row 3 and product term Sm_pt3) and one output signal (e.g. o1) and the corresponding sum of products is shown. Every row in the state table represents a product term. It should be noted that combinational functions can be represented as a sum of product terms. To ease the description it is assumed without loss of generality that there exists a state decoder, which generates for each state Sm of the FSM a corresponding signal Sm_Dec, which gets active if and only if the FSM is in state Sm. The inputs of each product term are then a state decode signal Sm_Dec, and the relevant input signals representing a row in the state table. E.g.: Sm_pt3 would be fed by the state decode signal Sm_dec and the input signals I1 (in inverted form) and I3. I2 is don't care and therefore not fed into this product term.

For a given output function those product terms are summed-up in an OR gate 36, if there is a '1' in the output of the corresponding row in the state table. Thus, only product terms Sm_pt1 and Sm_pt3 are fed into OR gate 36.

With reference to FIG. 4, the basic inventional approach is illustrated, i.e., to
a) deactivate -40-, i.e., to disable a product term and/or to
b) activate -42- or -44- a programmable product term.

Figure 5:
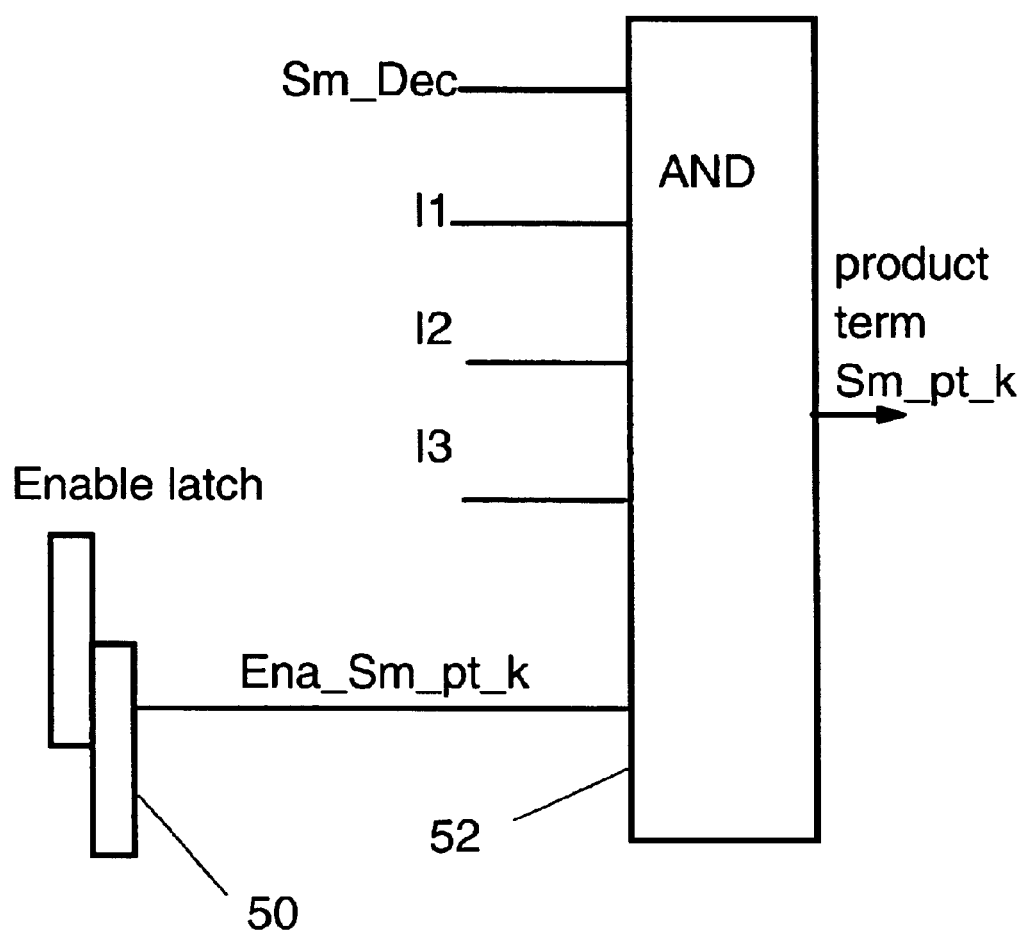
FIG. 5 is a block diagram representation illustrating an enable SRL for activating and deactivating a product term according to a preferred embodiment of the invention.
Figure 6:
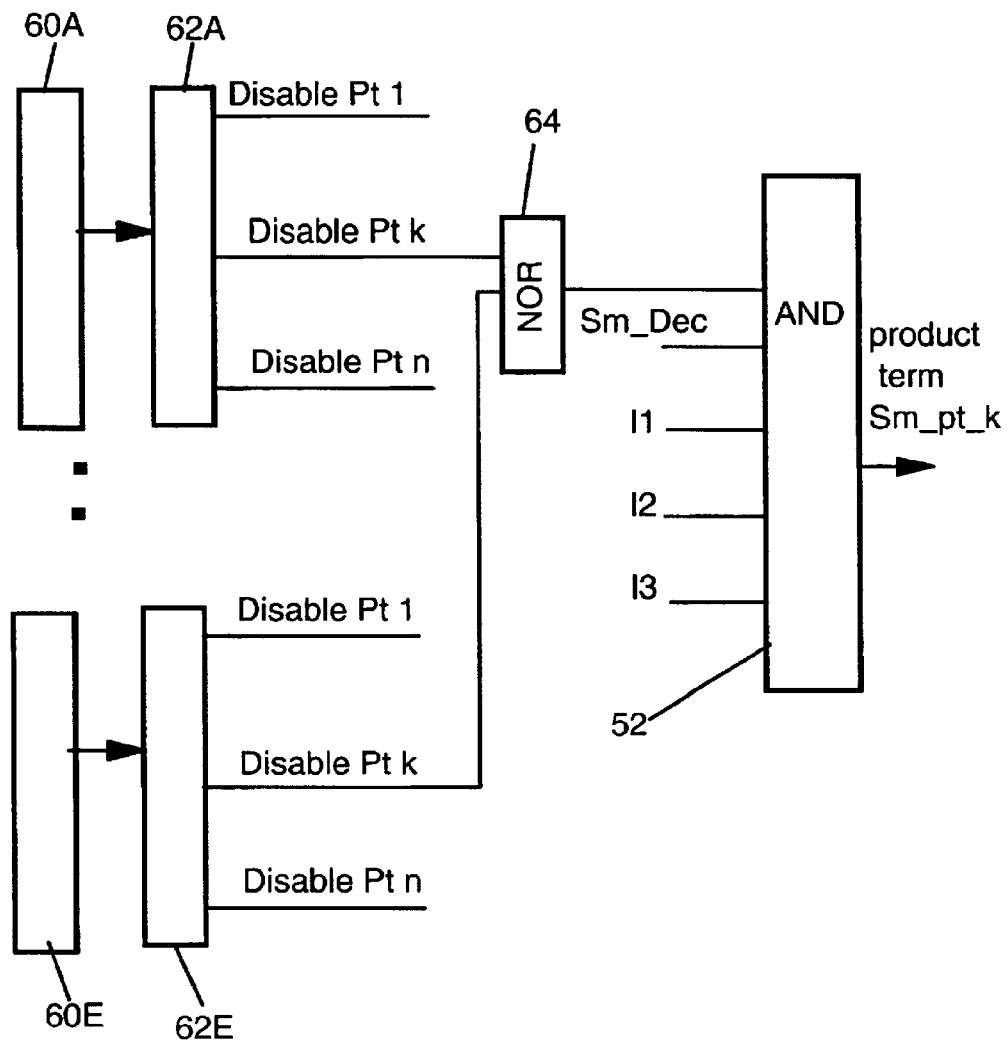
FIG. 6 is an alternative representation preferably used according to a preferred embodiment of the invention.

With reference to FIG. 5, the above-mentioned measure a) is preferably done by adding an "Enable means" for every product term. Preferably, this is a shift-only latch 50, the output of which is connected to an AND gate 52, the input signals of which further comprises the signal lines associated with the state decode Sm_Dec and the respective input vector (I1, I2, I3), as this was basically shown and described above with reference to FIG. 3. When switched to "OFF", a product term is disabled, as a '0' is output from the AND gate 52 and fed as an input into the OR gate 36, see FIG. 3. When switched to "ON" a term is enabled (which is the default case). This approach can be done as long as the number of terms is quite small, as e.g., up to a plurality of about 15 to 30 product terms which are envisaged to be reprogrammable. For higher number of product terms an alternative, preferred implementation is provided by the present invention, as illustrated next with reference to FIG. 6.

A predetermined set of j programmable "Disable Registers" 60 A, . . . 60E are connected to a respective number of decoders 62 A, . . . 62E. Each decoder generates n decode signals, where n represents the number of product terms of the machine. Each Decode signal Disable_Pt_k is fed into a NOR gate 64.

The output of said NOR gate 64 is fed to an AND gate 52, the function of which was already described above in FIG. 5 description.

An example is assumed, in which a number of n=256 product terms exist. Thus, 8 bits are necessary to code said number of 256 product terms. The decoder 62 A, . . . 62 E decodes which product term was written into the respective disable register 60 A, . . . 60 E, and the respective decoder signal gets active.

Thus, a particular product term is identified by said decoder output signal and can be treated as it was described before. In case, product term PT 7 and product term PT 19 must be corrected, the value 7 would be written into register 60A and the value 19 into register 60E. The NOR gate 64 would get an active Disable_PT_7 from decoder 62A. All other inputs to NOR gate 64 would be inactive. NOR Gate 64 would thus disable the product term. The decoder 62E would activate Disable_PT_17, which would feed the corresponding NOR Gate for product term 17 (not shown).

The number of j=5 disable registers is provided to disable up to j=5 product terms, which are to be deactivated according to the invention. The number of j=5 is exemplary only, and can be adapted to the specific experience a chip producer has, saying a given state machine shows in 99% of all cases no more than j=5 wrong product terms. Thus, in such situation, 99% of cases can be covered and can be corrected according to the invention. In many cases, a number of j=2 disable registers is sufficient per FSM.

Next, with reference to FIG. 7 it will be described how a programmable product term can be generated according to an inventive embodiment. In a generalized product term it must be possible to 'connect' each state decode and each input signal in either true or inverted form to the AND-gate. Also it must be possible that Don't care input signals are not 'connected' at all to the AND-gate. 'Connect' is meant from a logical point of view. In the following, the circuit means to implement those 'connections' will be described.

The facilities required are an Input Mask Register 70, an Input Compare Register 71, and a State Compare Register 72 with respective post-connected circuit comprising an AND gate 75, a compare logic 76 and 77. A post-connected AND gate 78 is provided for determining that a particular state is present, together with a particular input vector setting, as described above.

It should be noted that the AND gate 75 exists in vectorized form (i instances). These AND gates generate a modified Input Vector in which all input signals, which are don't care, are inactive. This is achieved thru the setup of the Input Mask register. Each bit in this register, for which the corresponding input is either a '1' or a '0' in the state table is set to '1'. All bits in the register for which the corresponding input is a don't care in the state table, are set to 0.

The resulting modified input vector is now compared with the value in the Input Compare (Cmp) Register in the CMP 76 logic. The CMP logic 76 generates a True output if and only if both input vectors fed to it are bit for bit identical. The bits in the Input Cmp register are setup such that for each '1' in the input vector in the state table the corresponding bit in the Input Cmp register is set to a '1' also. All other bits are set to '0'.

In a similar way the s bits of the current state vector are compared in a CMP circuit 77 with a State Cmp Register. The output of the CMP circuit 77 gets active, if and only if those two vectors are identical. Therefore this output represents a state decode. The outputs of the CMP circuit 76 and 77 are fed into an AND circuit 78, which produces a product term. Since this form of a product term can realize any kind of product term possible in the FSM, it is called a generalized product term (GPT). Thru programming of the registers in FIG. 7 the GPT gets personalized.

Figure 8:
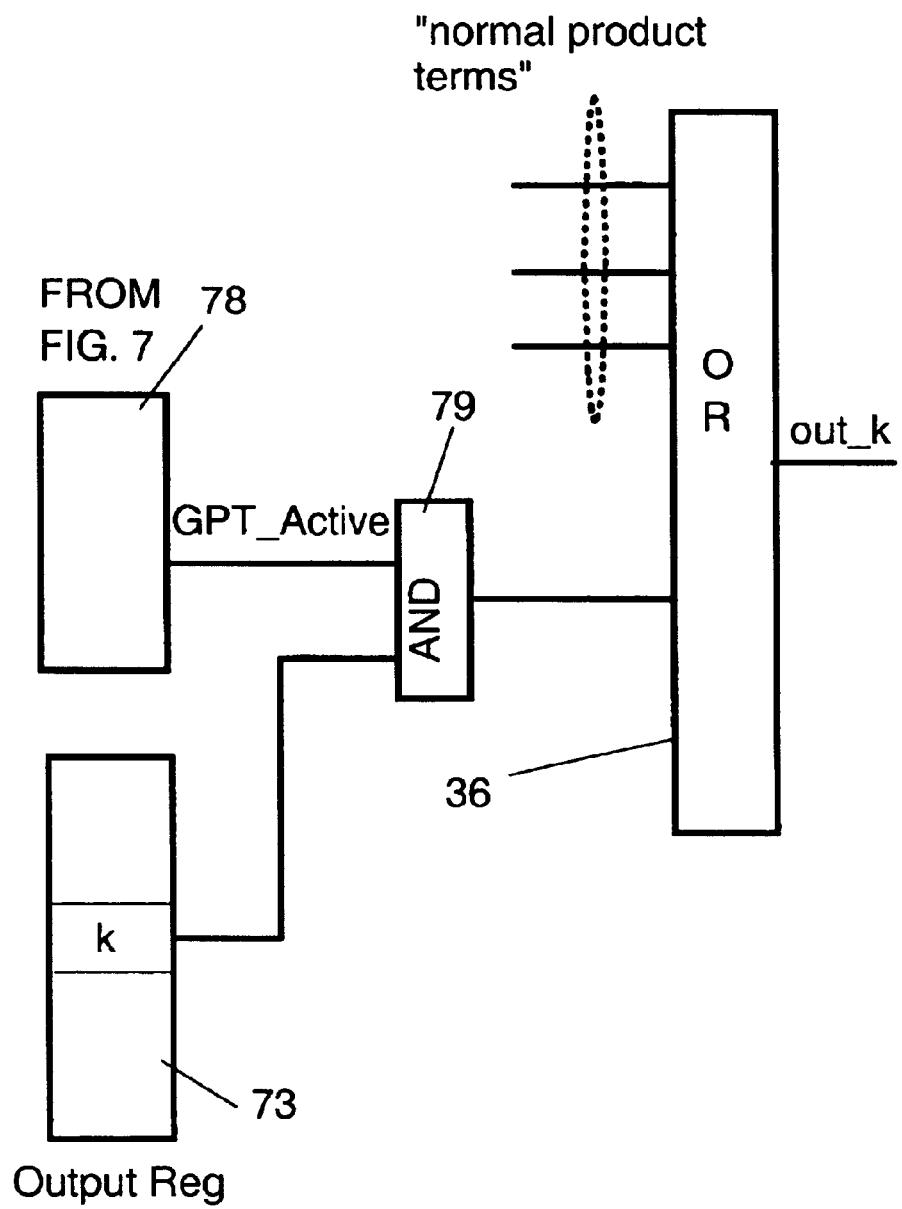
FIG. 8 is a continuation of FIG. 7.

In order to effect output signals (next state signals) this GPT must be 'connected' to some of the OR gates implementing the output (next state) functions. This is achieved with the means of FIG. 8.

An output register is needed in which each bit defines if the GPT has an effect (logical connected) to the output signal or not. If the GPT should activate output k, then the corresponding bit in the output register 73 must be set to 1. The output of AND gate 79 gets active, which in turn activates output k. If bit k in the output register is 0, then the AND gate 79 is inactive; the GPT has no effect on output k. For each output signal an individual latch and AND gate 79 is required. The same holds for the next state signals.

Figure 8A:
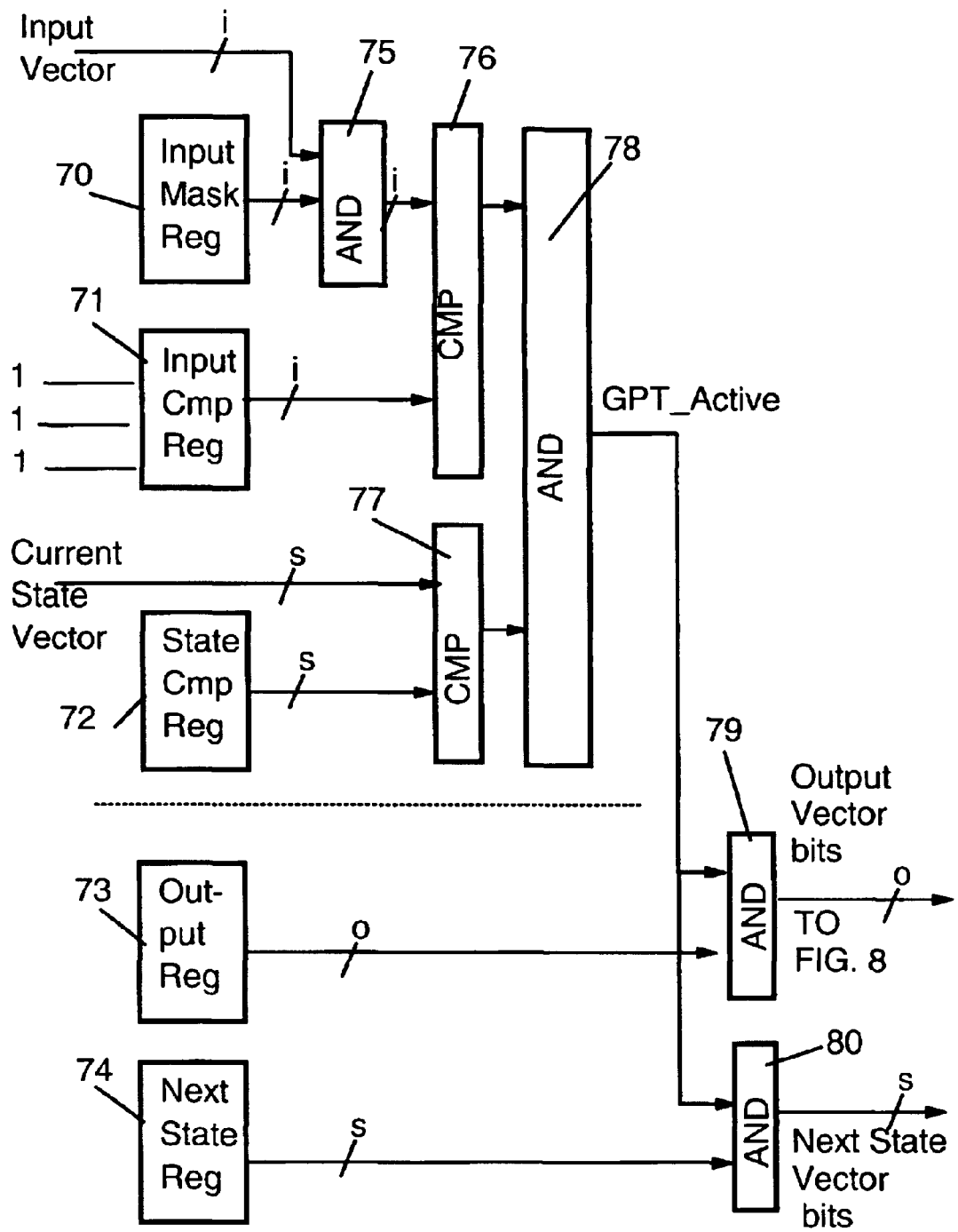

The logic circuit comprised of the GPT, the output register and the next state register is called a "programmable product term" (PPT). This is shown in FIG. 8a. Thru personalization of the output and/or the next state register in the PPT any output/next state signal can be modified if the GPT get active.

In short, a GPT is a general form of a Boolean function of a product term. The PPT activates the 'wires' from the GPT to the output/next state signals. In the default state the PPT is inactive, the output and next state registers are loaded with zeros. This means effectively that there is no 'wire' from the GPT to any output/next state signal.

Thus, as reveals from the above, a product term can be disabled, and a new exchangeable, free programmable product term may be activated, instead, in order to "repair" errors in the silicon of the FSM.

A preferred additional feature of the present invention consists in disabling and adding a new, correct, ie, "repairing" so-called "Otherwise"-term.

An important design element in a prior art state table-based designer toolbox is the so-called "OTHERWISE" expression. This design element is provided by most state-of-the-art development tools and is thus advantageous to be able to be implemented in a form which is also able to be repaired, if necessary. This circuitry allows to succinctly identify the rest of all precisely defined states and input settings—in FIG. 9 exemplarily depicted as Sm_PT_1, Sm_Pt_2, and Sm_Pt_3. This "logic OTHERWISE" rest" can then be implemented in a well defined path of the FSM, thus providing a consistent logic behavior without "gaps".

Figure 9:
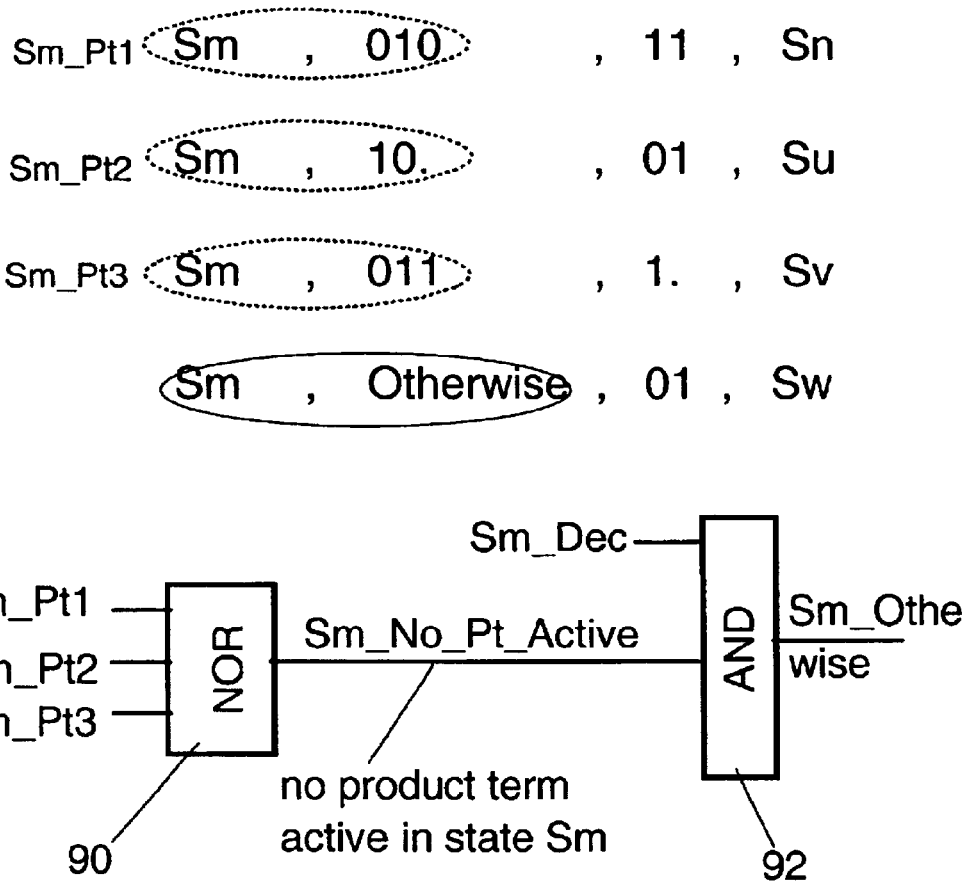
FIG. 9 is a prior art representation of prior art otherwise statement and implementation.

FIG. 9, which expresses state-of-the-art circuitry—shows the state table syntax in the above part, and the circuit implementation in the bottom part. What reveals from the bottom part of the drawing is that a NOR gate 90 is fed with said signals Sm_PT_1, Sm_Pt_2, and Sm_Pt_3. When none of them is TRUE, then the NOR gate 90 generates a TRUE control signal at its output meaning that the OTHERWISE case is present. This control signal is added with the Sm_Dec signal, decoding a given particular, exemplary state Sm, in AND gate 92. To implement partial programmability for FSMs using Otherwise the following tasks must be solved:

An 'erroneous' Otherwise term must be disabled;
If an additional state transition is required for a state (a PPT is activated for that state), then the Otherwise term for that state must be modified.

If a state was implemented without an Otherwise term and an Otherwise term is needed after silicon was built, then the capability to activate a programmable Otherwise for that state must be provided.

Figure 10:
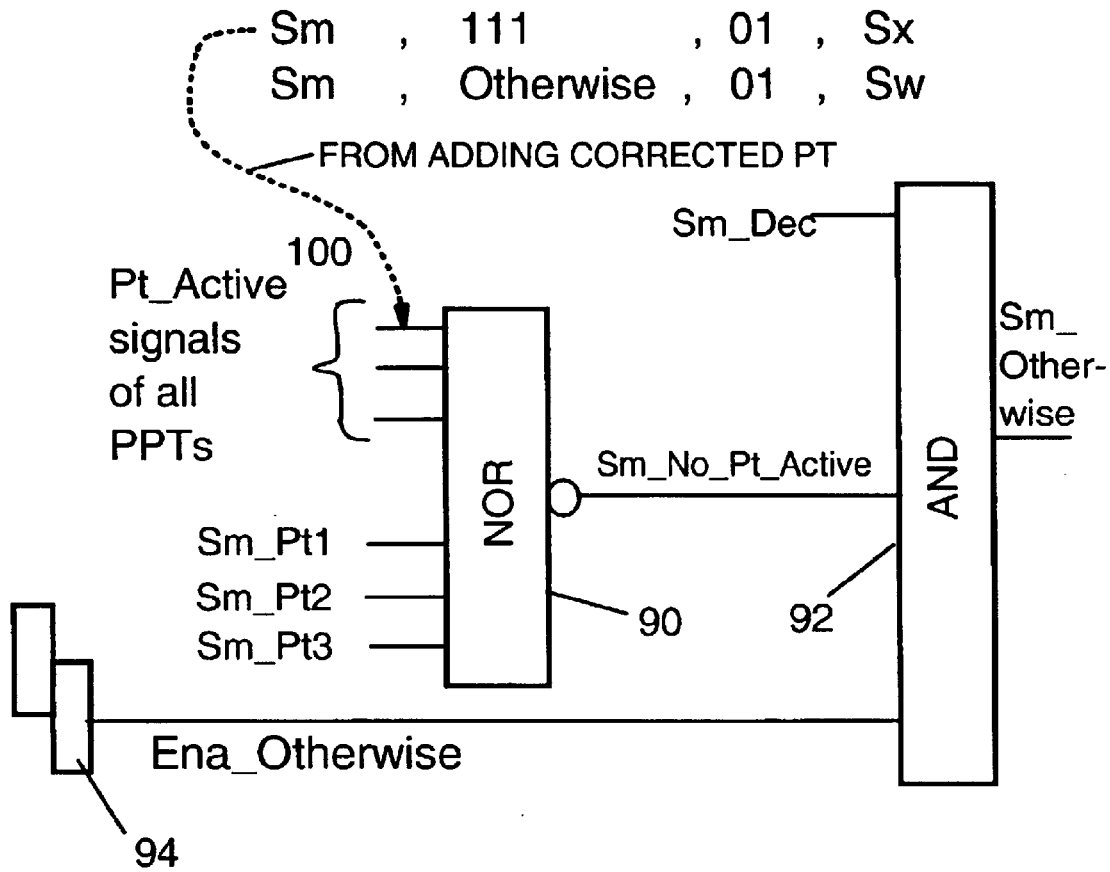
FIG. 10 is an overview schematic representation of disabling an otherwise term according to a preferred embodiment of the invention.

FIG. 10 illustrates, how a hardwired OTHERWISE term must be augmented in a partly programmable FSM. The first element is an "Ena_Otherwise" latch 94, which allows to completely deactivate the Otherwise function, similar to the latch used in FIG. 5. The next change is required for NOR gate 90. If in FIG. 10, row 4 is added to the FSM, then a PPT must be personalized such that a product term for this new row 4 gets active. Obviously the corresponding GPT_Active signal of that PPT must be connected to NOR gate 90. Since it is not known at the time the silicon is produced, which PPT implements which additional state transition functions, all GPT_Active signals of all PPTs must be connected to NOR gate 90.

It should be noted that the GPT_ACTIVE signals of activated PPTs, which do not belong to state Sm, do not change the behavior of the Sm_Otherwise signal, even if they are fed as inputs into NOR gate 90. This is due to the influence of the state decode signal (e.g. Sm_Dec) of AND gate 92 and the state decode signals fed into AND gate 78 (FIG. 7). If the PPTs belong to different states then those state decodes are never active at the same time.

Figure 11:
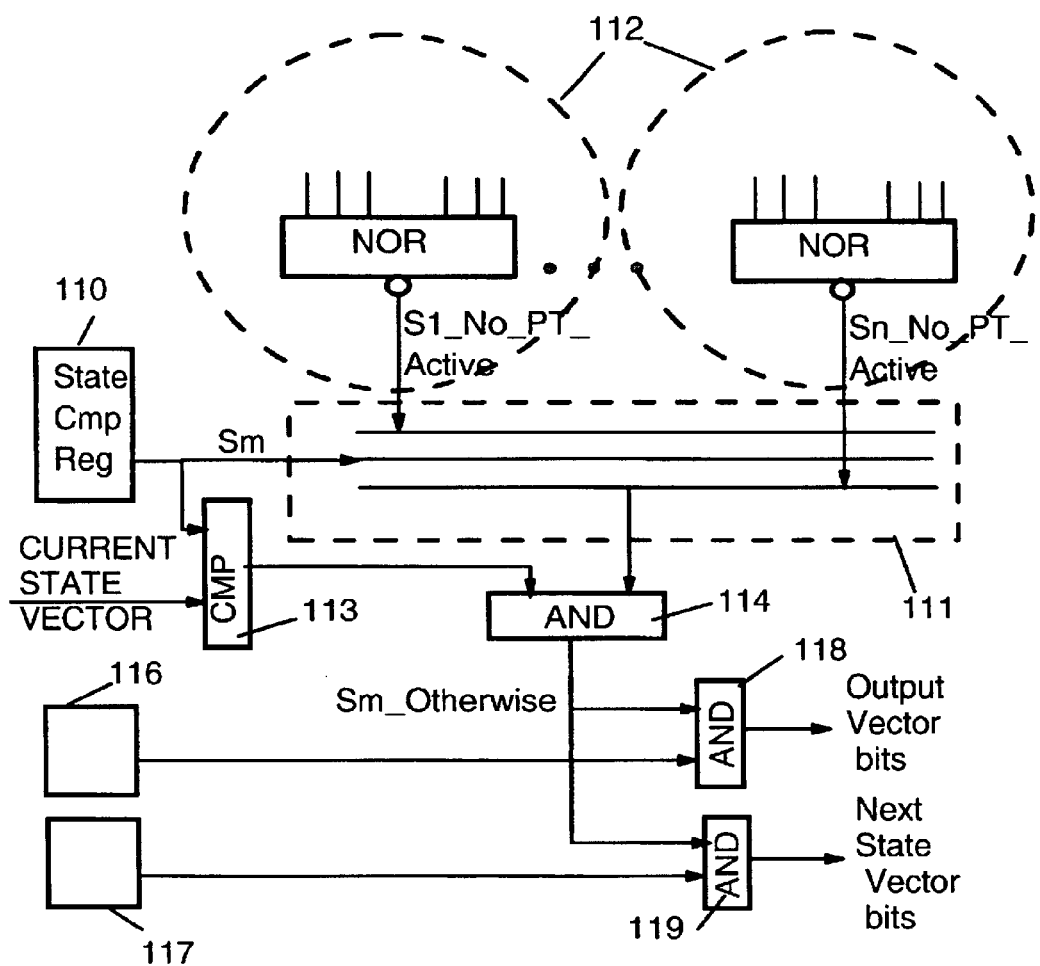
FIG. 11 is an overview schematic representation illustrating a programmable otherwise (PO) according to a preferred embodiment of the invention.

With reference to FIG. 11 a preferred implementation of a programmable "otherwise" circuit is shown. Such a programmable otherwise is needed, if in the 'original' transition no Otherwise statement existed for state Sm.

Figure 7:
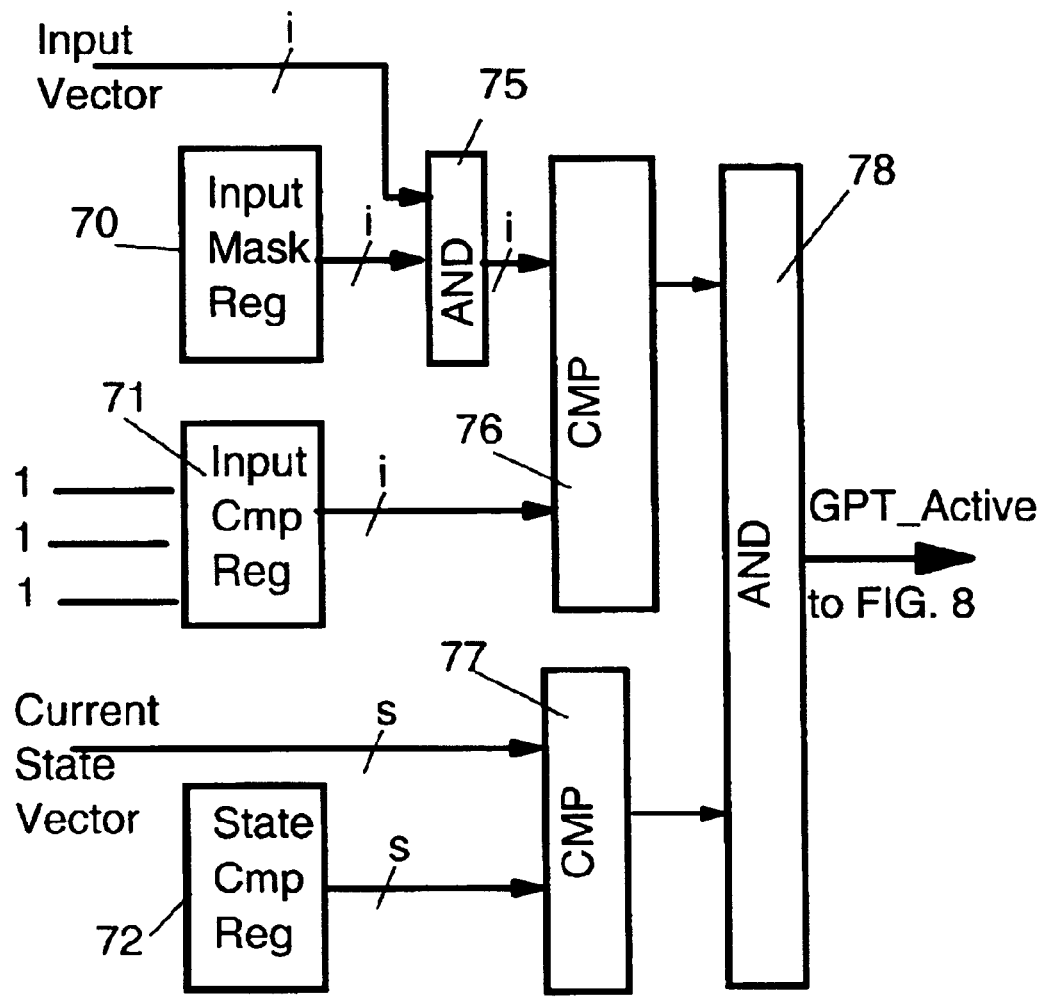
FIG. 7 is a schematic representation illustrating the inventive principle of providing a programmable product term (PPT) according to a preferred embodiment of the invention.

As in FIG. 7 a state compare register 110 and a CMP logic 113 is provided, which is fed by the current state and by the State CMP register. The current state Sm is used also to control a multiplexer 111 such that the multiplexer 111 drives the value of the Sm_No_PT_Active input to the output. At the output of AND gate 114 the signal Sm_Otherwise gets active, if and only if the current state is Sm and no product term for state Sm is active. The signal Sm_Otherwise is then used in a similar way as the GPT_ACTIVE signal in a PPT to modify the output vector and next state vector bits via the output register 116, 117 and the AND gates 118,119.

Figure 12:
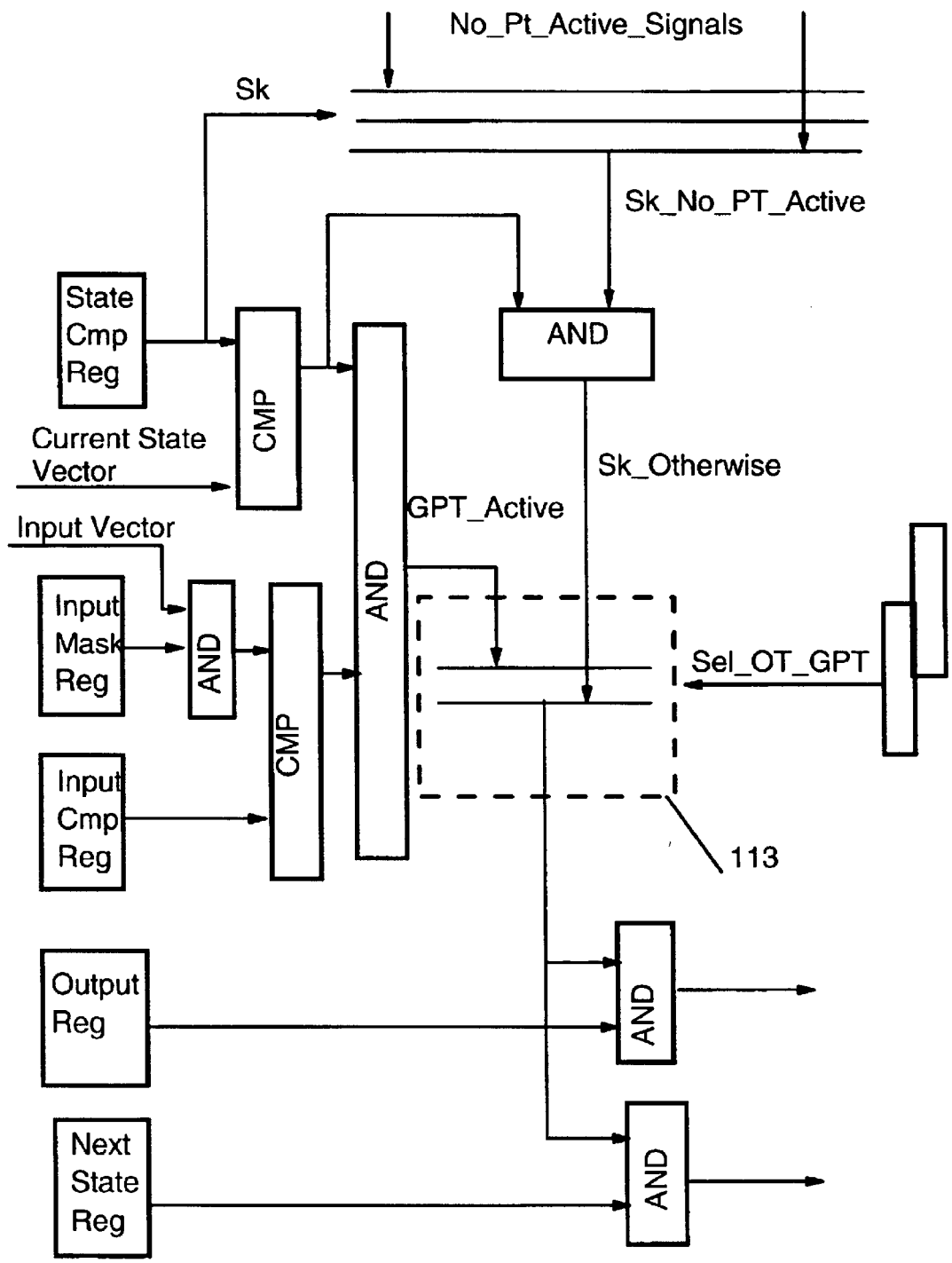
FIG. 12 is an overview representation illustrating a combination of PPT and PO according to a preferred embodiment of the invention.

FIG. 12 illustrates a combination circuitry for Programmable Product Terms (PPT) and Programmable Otherwise (PO).

The circuitry required for combining PPT and PO easily is achieved by simply making a superposition of the PPT and the PO circuitry. A simple latch and a multiplexer are needed to activate either function. For the details it can thus be made reference back to the above description and respective drawings.

Figure 13:
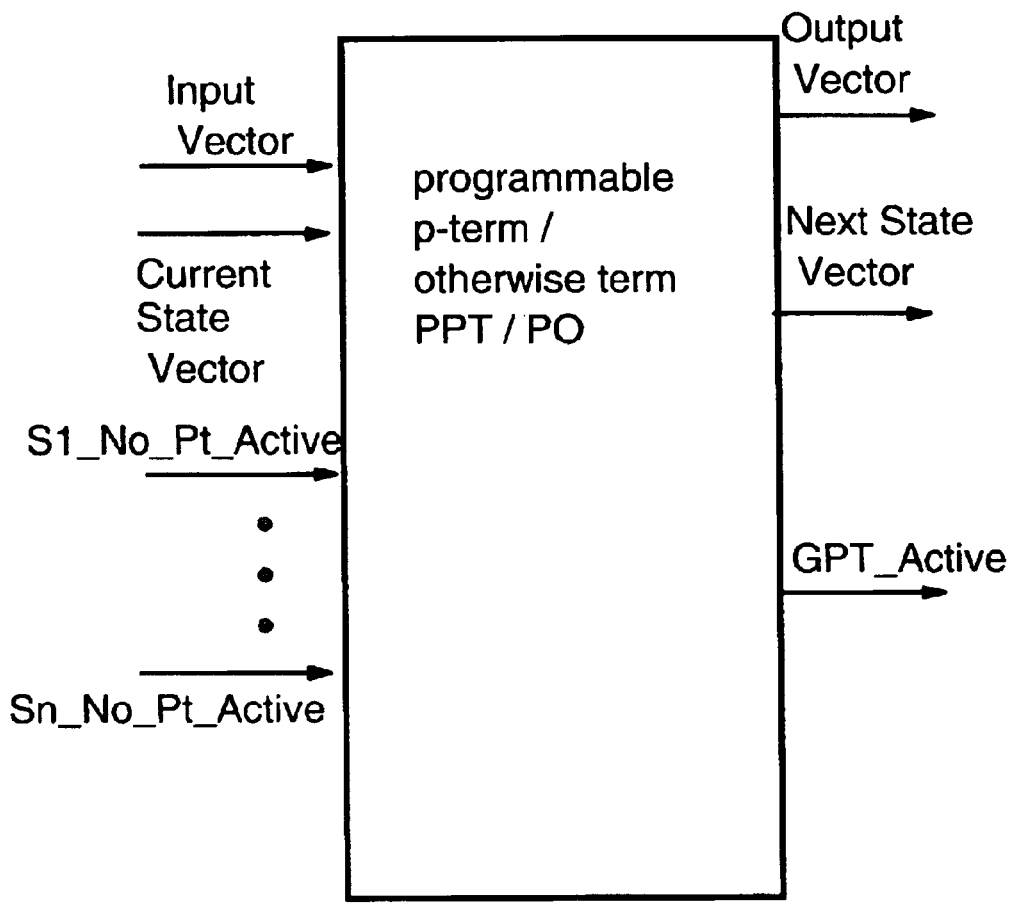
FIG. 13 is an overview representation illustrating the inputs/outputs of the circuit used in a combined PPT/PO-circuit according to a preferred embodiment of the invention.

FIG. 13 is an overview representation illustrating the various inputs and outputs of a combination circuit including PPT and PO facility according to FIG. 12. Inputs are Input vector and current state vector, and a plurality of control signals Si_No_PT_active saying that for a state Si no product term is active.

Output is the respective output vector for the current state and the next state, as well as a GPT_Active control signal obtained from the output of AND gate 78, see back to FIG. 7.

Figure 14:
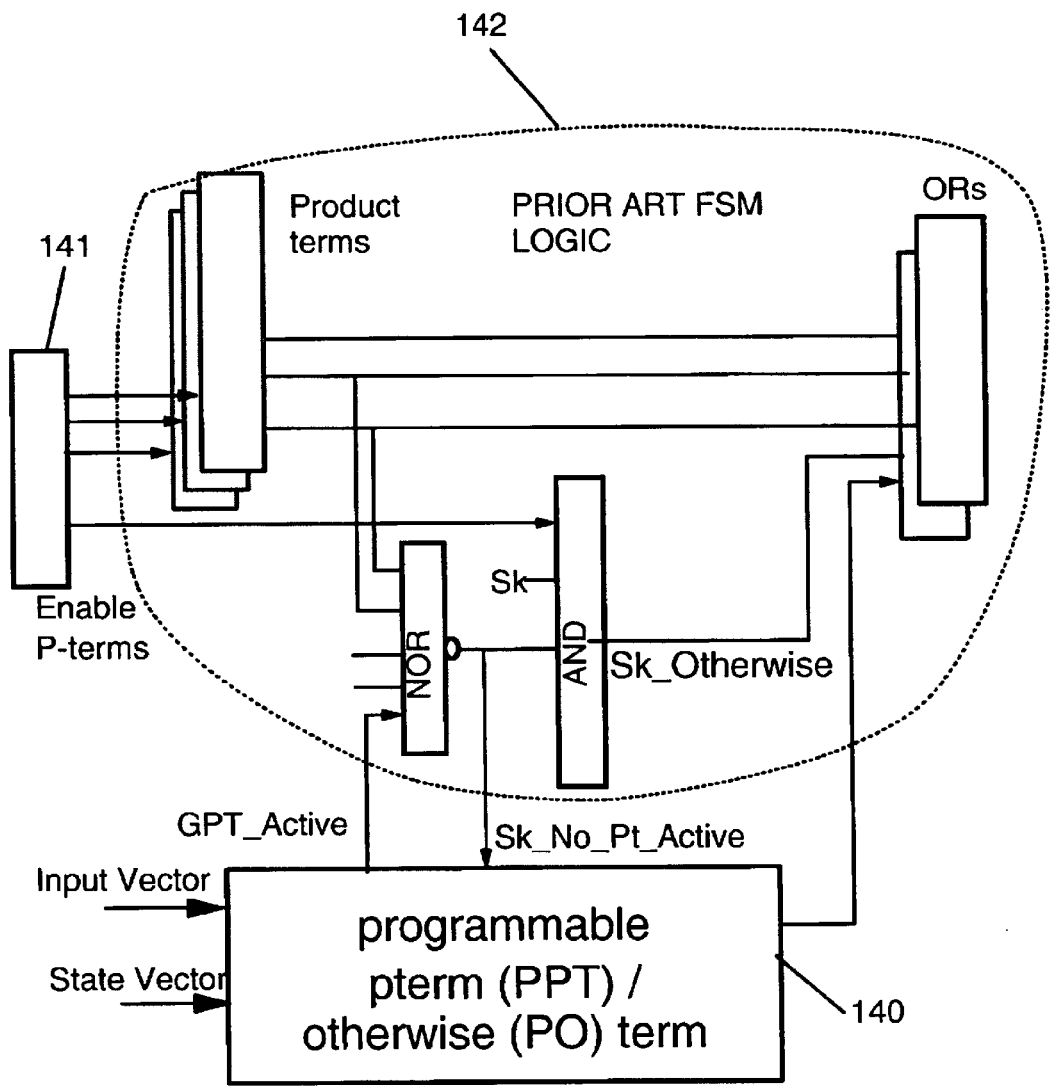
FIG. 14 is a schematic representation showing the connection of the PPT/PO-circuit to the FSM, according to a preferred embodiment of the invention.

FIG. 14 serves as an overview illustration of the connection of the inventive PPT/PO-circuit 140 described above to the prior art FSM 142, according to a preferred embodiment of the invention.

Circuit means 141 are depicted that allow that each hardwired product term can be disabled, and means 140 are depicted that add programmable product terms which allow to add new behavior to the state machine.

Scan-Only SRLs are preferably used to program the required behavior of those programmable product terms. As reveals from the drawing, the inventive circuits can be easily added to prior art logic concepts which are denoted by circle 142.

Figure 15:
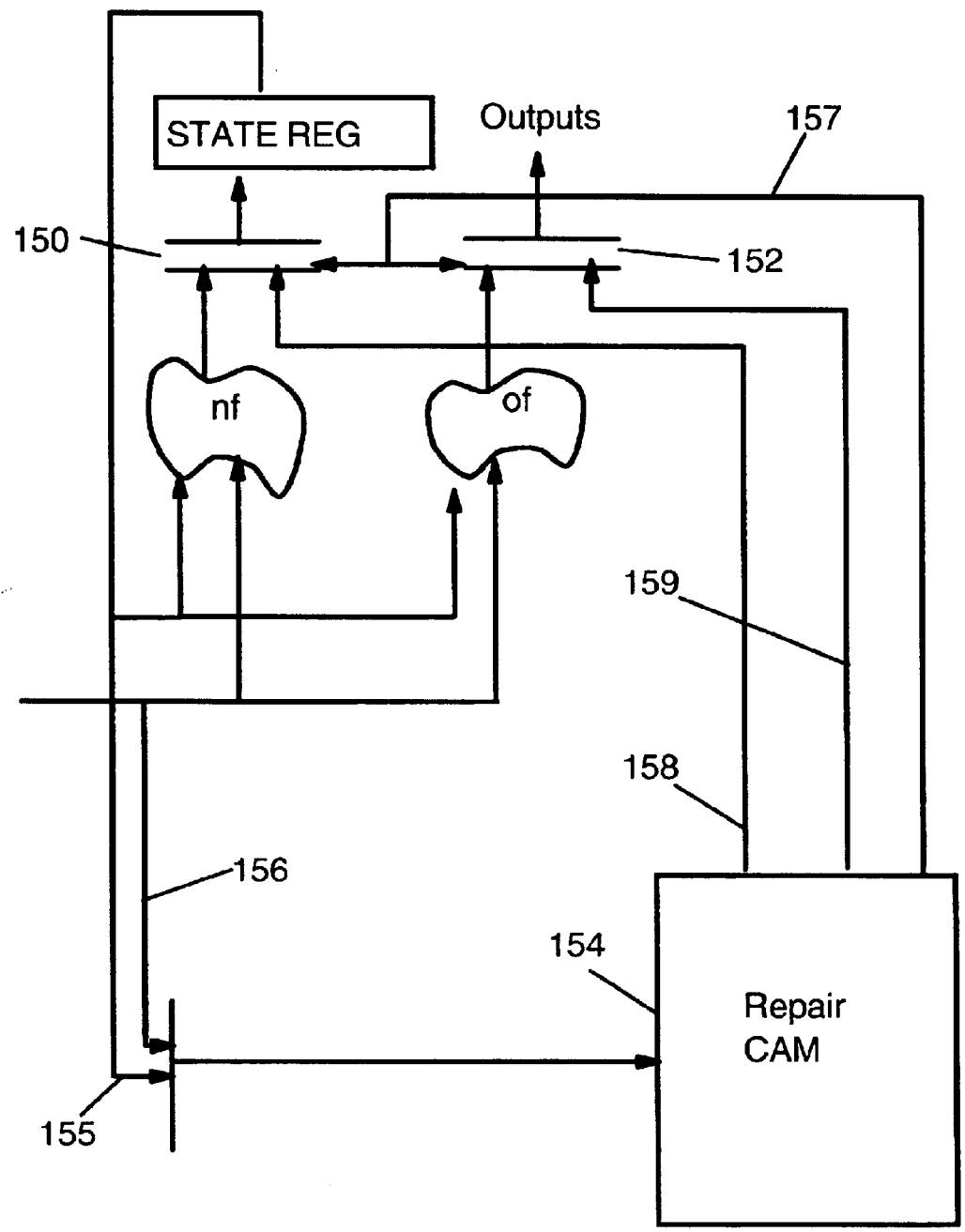
FIG. 15 is a schematic representation illustrating an alternative using a repair CAM according to a further preferred embodiment of the invention.

With reference to FIG. 15 an alternative solution to the inventive technical problem is disclosed. In this alternative, basically, the same inventive idea is followed, but instead of hardwired logic, which is added in the above-described embodiment to generate new corrected product terms or a new corrected "otherwise", a Content Addressable Memory (CAM), thus referred to as a Repair-CAM 154, is introduced. It comprises the corrected output bits required for error-free behavior of the FSM. The control logic required to know, under which circumstances the Repair-CAM is used for generating the corrected output bit values, is basically the same as described before. In so far, reference is made to the above description, where applicable.

In more detail, the state vector 155 and the above mentioned inputs 156, see FIG. 15, are used as search arguments into the Repair-CAM 154. If there is a row in the Repair CAM which matches the search argument, the Repair-CAM supplies the Next State vector and the outputs for the FSM, depicted with "nf" and of", again.

In order to do that a Multiplexer (MUX)-Select signal 157 is supplied by the Repair CAM, which gets only active if the search argument is found in the Repair-CAM. If said MUX_Select signal 157 is active, the multiplexers 150 and 152 select the outputs of the Repair CAM, via lines 158, and 159, respectively. If the MUX_Select signal is inactive, then the correct outputs of the nf and of functions are selected.

The inventive principles can be applied in a broad field of hardware technology. As Content Addressable Memories (CAM) are not available in all technologies, a similar implementation as disclosed above uses the concept of a Repair-RAM instead of a Repair CAM.

Figure 16:
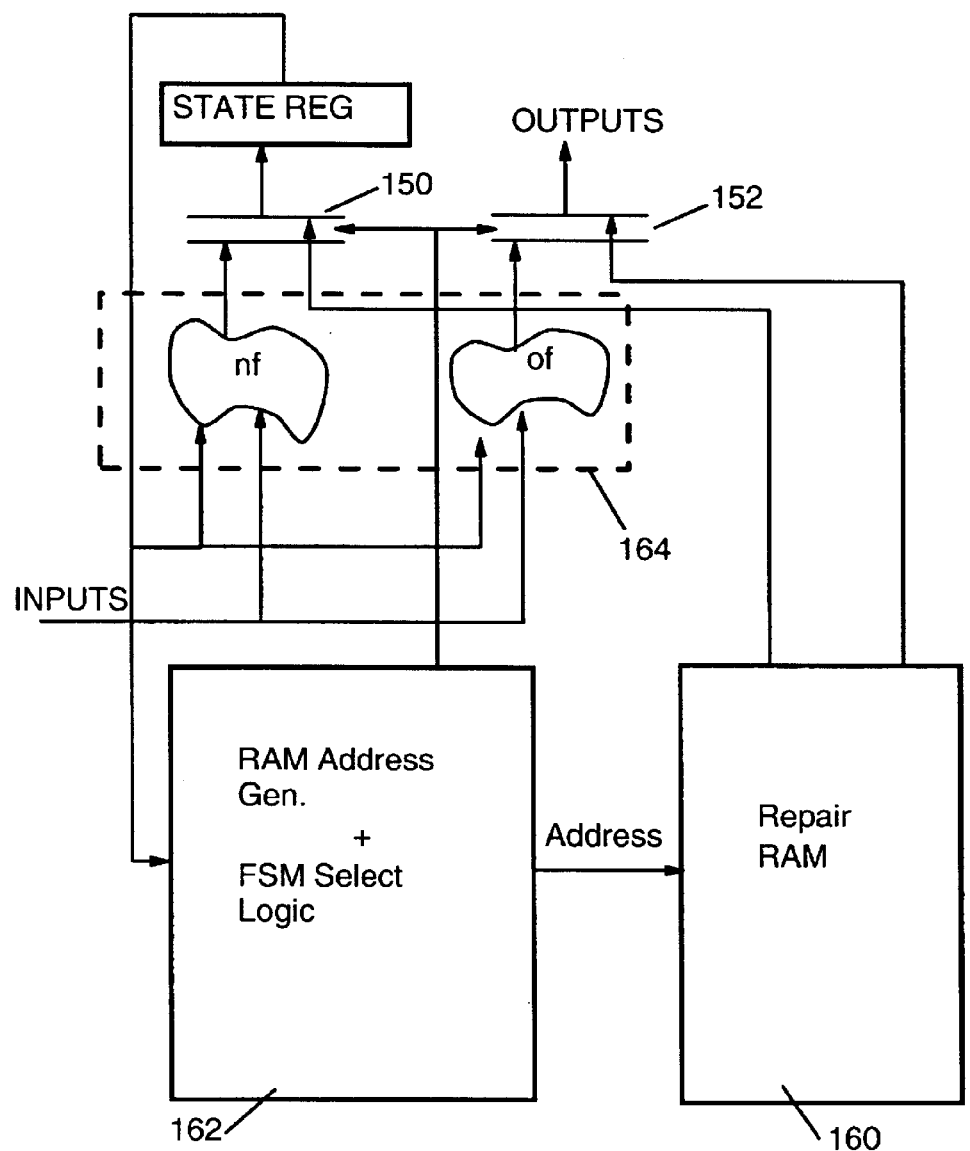
FIG. 16 shows a further inventive, alternative embodiment using a repair RAM.

With reference to FIG. 16 three basic components are shown. The hardwired FSM, depicted by a broken-line frame 164 with "nf" and "of" areas, further a Repair RAM 160, which takes over control of the state machine in case the original hardwired machine behaves erroneously, and a RAM address generation+FSM select logic, depicted in block 162. Said logic 162 controls two multiplexers 150 and 152, as above, which determine, if the hardwired FSM or the Repair RAM drive the next state and the outputs.

With this structure the density advantage of a RAM compared to the Shift-Register Latches (SRLs) used in programmable product terms could be advantageously taken profit from. In such a structure, if one of the state transitions or outputs of a state has an error, then all the logic associated with that state will be disabled, and the Repair RAM 160 will completely control all the outputs and state transitions belonging to that state. The Repair RAM 160 is preferably organized like a cache in several compartments, and every compartment covers one of the rows belonging to one state. This preferred embodiment is further shown in FIG. 17.

Figure 17:
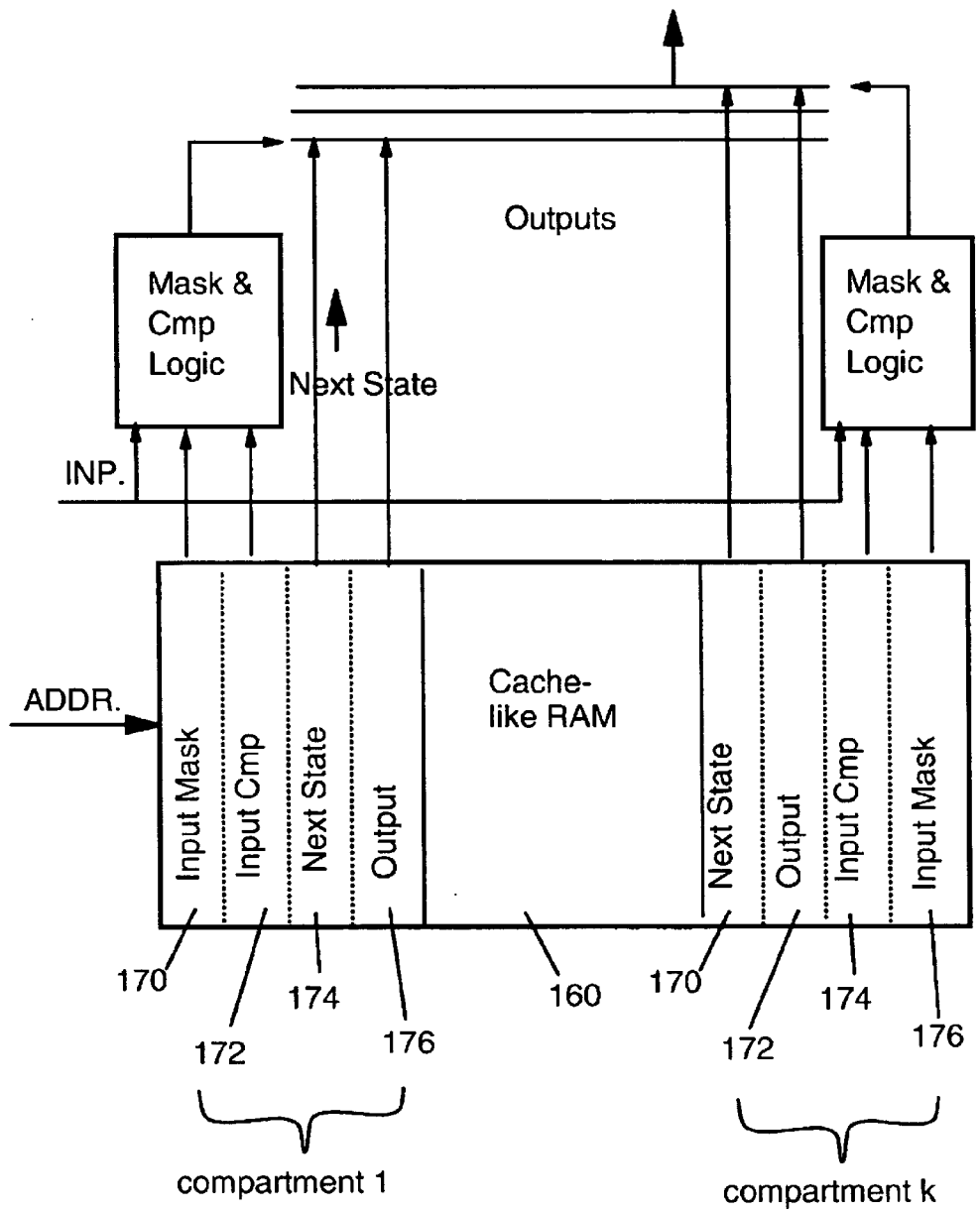
FIG. 17 shows details of FIG. 16.

With reference to FIG. 17, the Repair RAM 160 is depicted at the bottom part of the drawing. It comprises a predetermined number k of compartments. The number k is determined by the largest number of state transitions in a state; e.g., in FIG. 2 there are defined a number of 3 state transitions for state Sm, and a number of 2 transitions for state Sn. Therefore, k would have to be 3.

Each compartment comprises an Input Mask field 170, an Input Compare field 172, a Next State field 174 and an Output field 176. A Mask and Compare logic 178 is connected to respective ones of above mentioned Inputs and to a respective Input mask field and Input Compare field. The compare logic 178 works basically in the same way as the corresponding logic in the PPT hard wired embodiment mentioned above. Thus, only with some small amount of separately provided logic an "Otherwise" function can be implemented additionally, as well.

Figure 18:
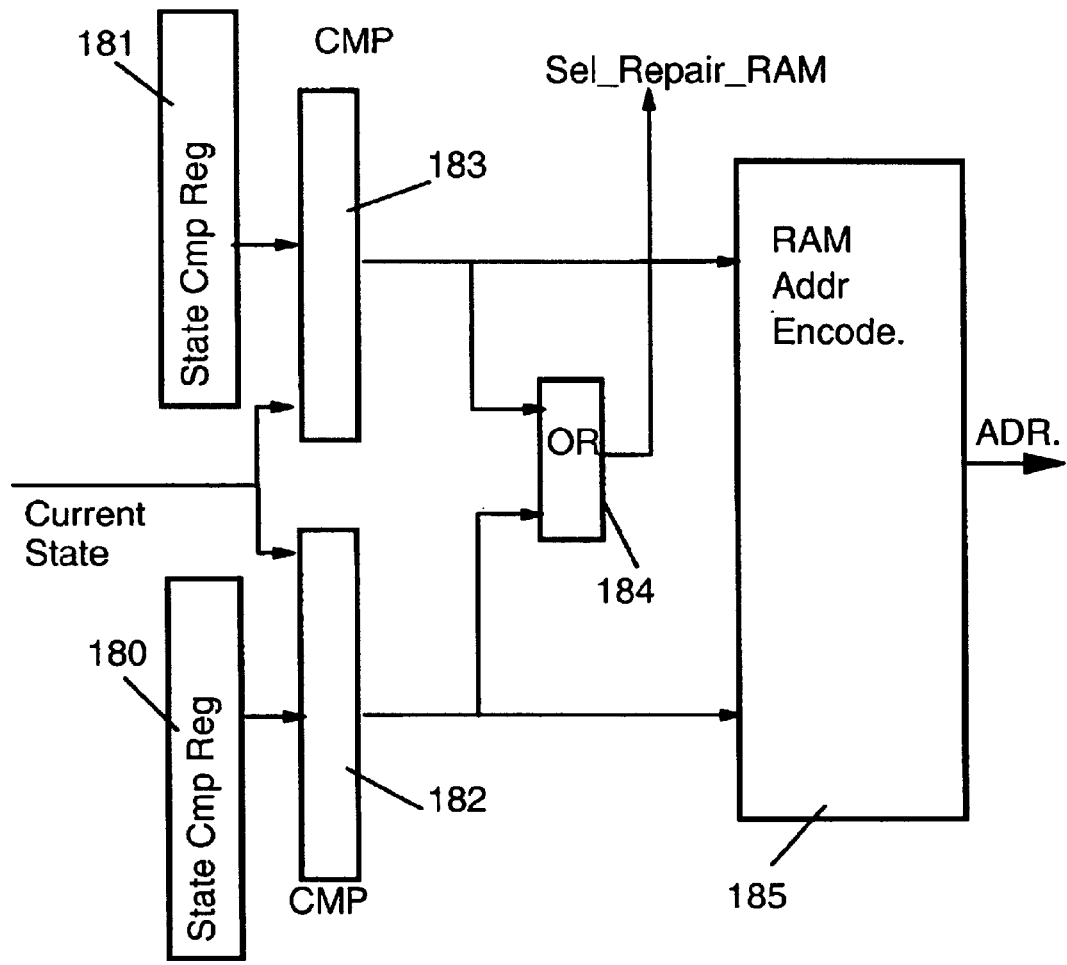
FIG. 18 shows further details of FIG. 16.

FIG. 18 shows the logic block 162 (see FIG. 16) details required for the address generation for the Repair-RAM. It selects, which of the state machines, the hardwired, or the Repair-RAM FSM, will drive the outputs for current and the next state.

The Repair RAM Address Generation logic 162 comprises one or a plurality of State Compare Registers 180, 181, which are loaded with the value of the particular state, which must be corrected. For every State Compare Register 180, 181, a Compare logic 182, 183 is output-connected, which compares the current state with the value of its respective State Compare Register. If both match, then the Repair RAM must take over control, as it was indicated earlier above.

In particular, via an OR-Gate 184 a "Select-Repair-RAM"-signal gets active which controls the multiplexer in FIG. 16 such, that the Repair-RAM drives outputs and next state signals. Further, the signals from the Compare logic 182, 183 are fed into a RAM Address Encode logic 185, which converts the 1-of-n code of the plurality of n "generate Address of x" i.e., "Gen_Addr_x" signals into a binary encoded address.

Since most of the Finite State Machines are generated by program tools, which use either a state diagram or a state table as an input, there is no time-consuming effort required for a designer to add the new inventive elements. All necessary is to specify of correction circuits, i.e., how many PPTs, or how many additional states in the Repair-RAM case the developer considers to add to his state machine. For all the rest of design work, the prior art FSM design tool takes care. Thus, with a careful choice, which should be a good compromise between additional costs and correction potential, the FSM comprising hardware can be brought quicker and cheaper to market.

While the preferred embodiment of the invention has been illustrated and described herein, it is to be understood that the invention is not limited to the precise construction herein disclosed, and the right is reserved to all changes and modifications coming within the scope of the invention as defined in the appended claims.

What is claimed is:

1. A partly reprogrammable Finite State Machine including a state register holding the current state and two functions (of and nf) comprising combinational logic to calculate the outputs and the next state, respectively, said combinational functions being representable in a "sum of product terms form", said Finite State Machine comprising:
   a) a circuit disabling a predetermined number of product terms associated with said "sum of product terms form", each product term corresponding to a given state and a given input vector setting,
   b) a circuit enabling a new product term for a predetermined respective number of new product terms generating for each, a correct output signal corresponding to a given error state and a given error input bit vector, and
   c) said disabling and/or enabling circuits being provided in a form which allows activation thereof in case a product term was tested to include a bug.

2. The state machine according to claim 1, in which the circuit disabling a predetermined number of product terms comprises a control latch, the output of which connects to a logical AND gate, the input signals of which further comprise signal lines associated with the error state and the respective input vector.

3. The state machine according to claim 1, in which the circuit disabling a predetermined number of product terms comprises a respective number of disable registers, each associated with a respective decoder.

4. The state machine according to claim 1, in which the circuit enabling a new product term comprises:

a) an input mask register,
b) an input compare register,
c) a state compare register, and
d) an output register, which holds the corrected output signals.

5. The state machine according to claim 4 which further comprises a next state register, which holds the output signals for the next state.

6. The state machine according to claim 1, further comprising:
a) circuit disabling an error-comprising otherwise logic, and
b) circuit enabling a new corrected otherwise logic, which comprises logic reflecting enabled new product terms.

7. The state machine according to claim 1 in which,
the circuit disabling a predetermined number of product terms, the circuit enabling a predetermined respective number of new product terms and a corrected output signal vector are programmed in a content addressable memory, and
whereby the error state and the error input vector is used as a search argument into said content addressable memory.

8. The state machine according to claim 1 in which the circuit enabling a new product term comprises a Random Access Memory (RAM) including logic creating a corrected output vector, and a RAM address generation logic is provided for selectively accessing respective RAM entries, and a state machine select logic is provided for selecting between activation of either the regular state machine or the RAM for generating a desired output vector.

9. The state machine according to claim 8 in which the RAM comprises a plurality of compartments, each of them comprising input mask logic, input compare logic, next state logic and correct product term output signal logic, respectively.

* * * * *